June 21, 1960  V. L. STREETER  2,941,401
ADJUSTABLE FLOW METER
Filed Oct. 15, 1956  2 Sheets-Sheet 1
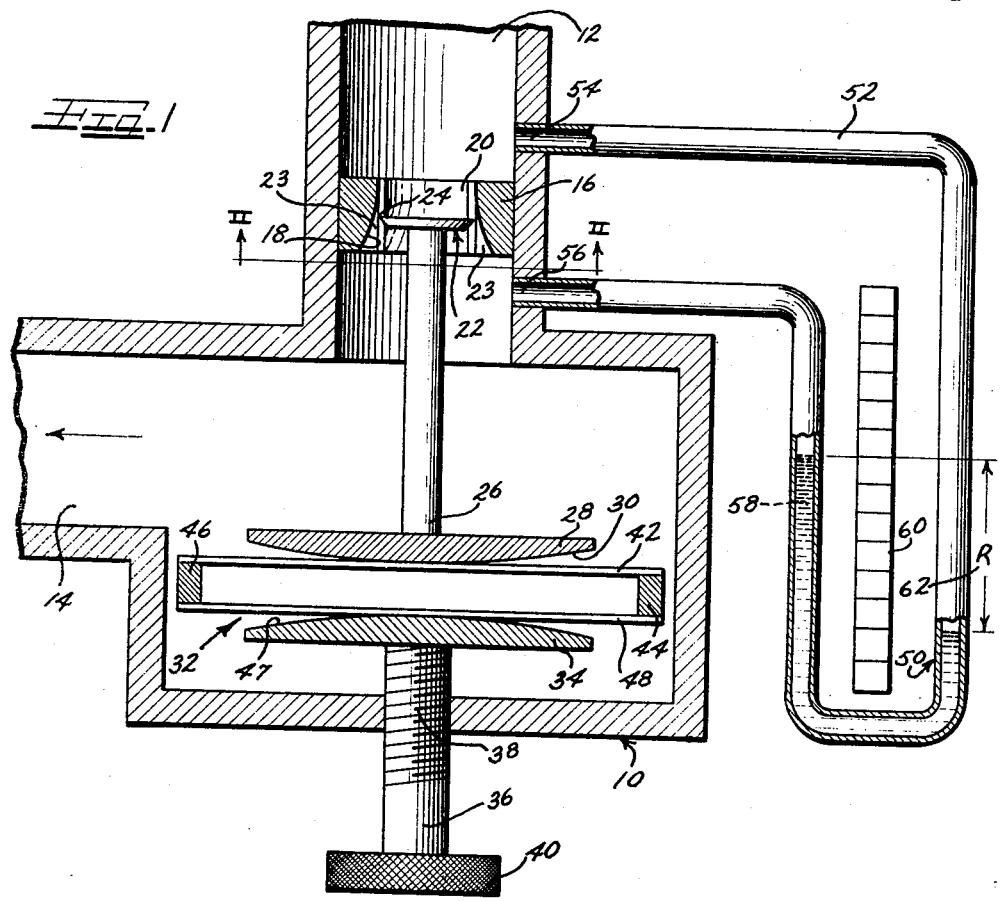
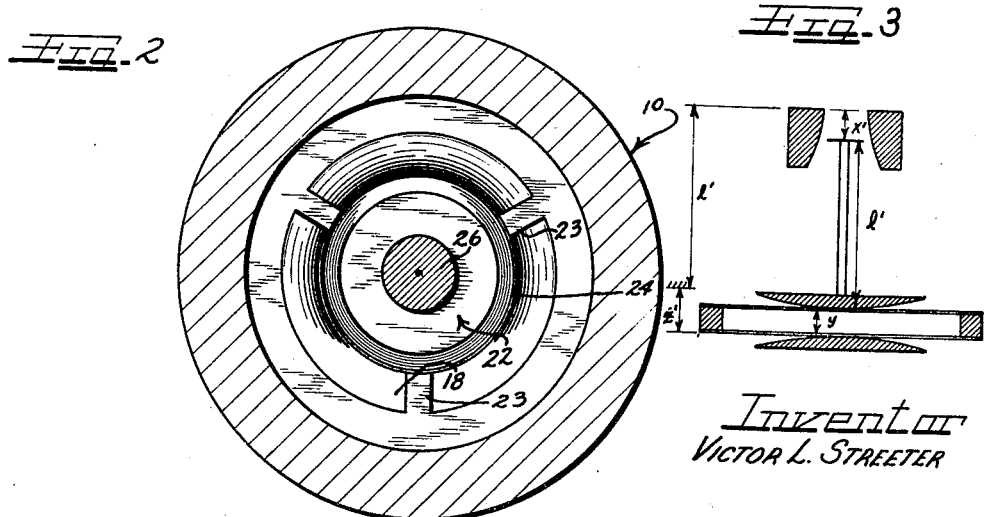
Inventor
VICTOR L. STREETER June 21, 1960 V. L. STREETER 2,941,401
ADJUSTABLE FLOW METER
Filed Oct. 15, 1956 2 Sheets-Sheet 2
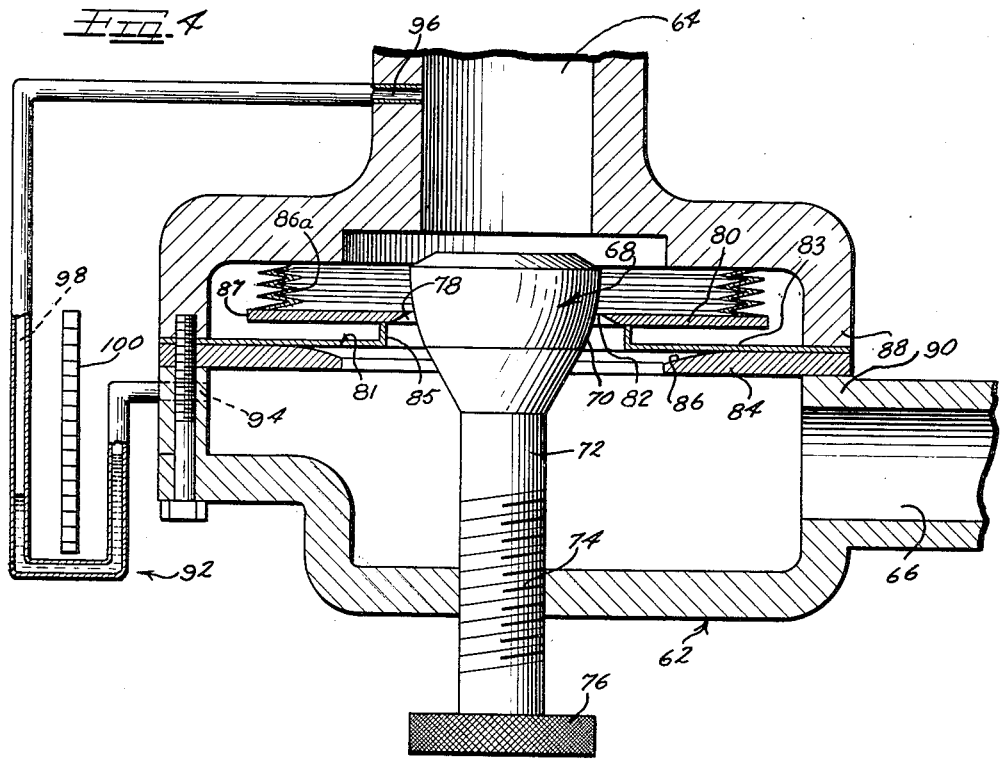
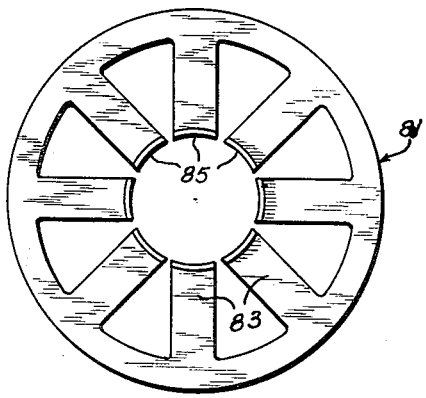
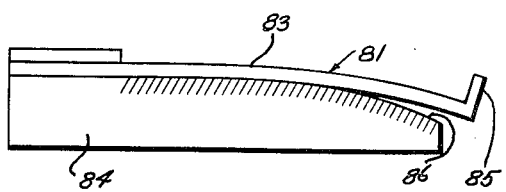
Inventor
VICTOR L. STREETER
By Hill, Sherman, Meroni, Gross & Simpson
Attys.

United States Patent Office 2,941,401
Patented June 21, 1960

2,941,401

ADJUSTABLE FLOW METER

Victor L. Streeter, Ann Arbor, Mich., assignor to The Dole Valve Company, Chicago, Ill., a corporation of Illinois Filed Oct. 15, 1956, Ser. No. 615,863

1 Claim. (Cl. 73—210)

The present invention relates to a flow meter for measuring the rate of flow through a conduit and relates to a flow meter wherein the sensitivity of the member is adjustable.

In the measurement of the flow of fluids it is advantageous to utilize a flow meter which is extremely accurate, reliable and uncomplicated in construction and operation. It is also important to provide a meter which is adjustable in its range of sensitivities. The present invention contemplates the provision of a flow meter which in one form utilizes a movable thin edged poppet disc positioned within a shaped orifice having a varying cross section in order that the flow area will increase with increase in pressure drop across the poppet disc and with relative movement of the poppet disc. The poppet disc is supported on a nonlinear spring support and the relationship between the spring support and orifice throat is such that the flow through the orifice can be measured as a linear function of the pressure drop across the orifice. The position of the nonlinear support for the valve poppet is adjustable to thereby adjust the sensitivity or range of the meter.

In another form the central valve poppet or head is fixed and the orifice defining member is movable. The valve head is shaped with an outer surface of revolution to increase the cross sectional flow opening with increase in pressure head and movement of the orifice defining member. The orifice defining member is supported by a nonlinear spring support. Again, the relationship between the central valve head and the orifice and the nonlinear spring support is such that the rate of flow through the metering valve can be measured as a linear function of a pressure drop across the orifice. The sensitivities and range of the valve are adjustable by the provision of an adjustable support for the central valve poppet.

It is an object of the invention to provide a flow metering valve which avoids disadvantages of prior art devices and which provides an improved flow meter suitable for use in a stream of fluid wherein the flow is indicated by means reading linearly proportional to the flow.

Another object of the invention is to provide an improved flow meter having an adjustable sensitivity and range.

Another object of the invention is to provide a flow meter having an orifice with a profiled throat and with a movable poppet head positioned in said throat whereby the flow area will vary as the square root of the pressure head and wherein the poppet head is provided with a backing means which provides a nonlinear support for the position of the poppet relative to pressure drop across the orifice.

Yet a further object of the invention is to provide a flow meter having a profiled central valve head with a thin flat orifice defining member movable relative thereto wherein the flow area between the orifice and valve member will vary as the square root of the pressure head and wherein the orifice defining member is provided with a backing which provides a nonlinear support to permit variance of the position of the orifice with variations in pressure head.

Another object of the invention is to provide a metering valve poppet and orifice wherein one of the members has a profile following the relationship $$C_D A = (C_D A)_{min} e^{\frac{x' \ln H}{2Y_0}}$$

and wherein the position of the other member is controlled by a nonlinear backing.

Another object of the invention is to provide a flow metering valve having an orifice and a poppet therein to define a flow path therebetween with relative movement of the members and wherein the movable member is controlled and positioned by a nonlinear backing and the position of one of the members is adjustable to vary the sensitivity and range of the flow meter.

Another object of the invention is to provide an improved metering valve including a poppet positioned within an orifice with one of the members having a profile following the relation of $$x = \frac{2Y_0}{\ln H} \left\{ \ln \left[ 2\sqrt{2} \frac{r_0 + \frac{t}{2}}{r'^2 - r_0^2} \frac{Y_0}{\ln H} \sqrt{1 - \sqrt{1 - \left(\frac{t \ln H}{Y_0}\right)^2}} \right] - \frac{1}{2} \left[ 1 - \sqrt{1 - \left(\frac{t \ln H}{Y_0}\right)^2} \right] \right\}$$

wherein one of the members is regulated in position with variations in pressure head by a nonlinear support.

Another object of the invention is to provide a flow meter having a valve head and surrounding orifice with one of the members being profiled so that the area between the orifice and valve member varies exponentially and the movable member is spring supported wherein the action is exponential such that the discharge increases linearly with the pressure drop across the disc.

Another object of the invention is to provide a poppet type of flow meter wherein with a head positioned within an orifice and with one of the members profiled to avail a varying cross sectional flow area with changes in pressure and wherein one of said members is movable, being supported by a nonlinear support, with a means to measure the pressure drop across the orifice to indicate linearly the rate of flow therethrough.

A further object of the invention is to provide a metering valve having an orifice and a head therein with one of the members movable relative to the other and one of said members having a surface of revolution to vary the cross sectional area with relative movement of the members and wherein the movable member is controlled in position with variations in head by a nonlinear spring backing which obeys the law $$h = h_0 H e^{\frac{y \ln H}{Y_0}}$$

Other objects and advantages will become more apparent in the complete disclosure of the invention in connection with the description of the preferred embodiment in the specification, claim and accompanying drawings in which:

Figure 1 is a somewhat diagrammatic view shown in cross section of a preferred form of flow meter utilizing the principles of the present invention;

Figure 2 is a sectional view taken along line II—II of Fig. 1 and illustrating the relative construction of the poppet head and orifice;

Figure 3 is a diagrammatic view of certain of the basic elements of the flow meter with dimensional markings to illustrate the mathematical principles in accordance with which the present flow meter is constructed;

Fig. 4 is a somewhat diagrammatic view shown in cross section of a preferred form of a flow meter utilizing the principles of the present invention;

Fig. 5 is a plan view illustrating a preferred form of orifice supporting spring; and Figure 6 is a diagrammatic view of the spring and spring support illustrating the relative action therebetween.

In the drawings, and particularly with reference to Fig. 1, the flow of a moving fluid is to be measured passing through a conduit and the flow meter will be connected to the conduit with the flow passing therethrough. The flow meter is shown encased in a housing 10 having a hollow interior and provided with an inlet end 12 and a discharge end 14. These ends are connected in the flow line in order to meter the flow of fluid therethrough.

Between the inlet 12 and discharge 14 from the housing, is provided an orifice defining member 16 suitably secured to the walls of the housing 10 and having an internal surface of revolution 18 to define an orifice 20. Movable within the orifice 20 of the orifice member 16, is a thin poppet disc or head 22. This disc has a thin edge 24 so as to create a minimum of interference to the flow of fluid and to insure performance of the flow meter in accordance with the mathematical laws by which it is designed.

The valve head 22 may be guided for vertical reciprocation within the orifice 20 by separated vanes 23 connected to the curved profiled face 18 of the orifice member 16 but in some instances these vanes may be omitted and in general they are not taken into consideration in the mathematical development of the surface as will be presented later.

The movable head 22 is supported on a stem 26 which is secured at its lower end to a base member 28 having a rounded convex lower surface 30. The base 28 with the stem forms the support for the movable head 22 within the orifice 20 and the head will move within the orifice with fluctuations in pressure and for this purpose is provided with a nonlinear spring backing shown generally at 32.

The nonlinear backing springs 32 rest on the upper curved face 47 of a contoured support member 34 mounted on the top of an adjusting screw 36. The adjusting screw 36 carries threads 38 and has a knurled adjusting knob 40. Rotation of the adjusting knob 40 will move the supporting plate 34 up or down to vary the position of the nonlinear backing springs 32 thereby controlling the position of the control head 22 in the orifice and changing the range and the sensitivity of the meter.

The nonlinear backing consists of a cantilever arrangement with an upper spring 42 secured at its ends to spacing and mounting blocks 44 and 46. Spaced from the upper cantilever spring 42, is a similar lower cantilever spring 48 which is similarly secured at its ends in a cantilever fashion to the spacing and mounting blocks 44 and 46. These mounting blocks separate the springs and carry them in cantilever fashion and although a single pair of leaf type springs 42 and 48 is illustrated it will be understood that a plurality of pairs of springs can be angularly arranged, each provided with mounting blocks.

The upper spring 42 supports the contoured lower face 30 of the base 28 and the lower spring rests on the upper contoured face 47 of the supporting member 34. The contoured faces 30 and 47 of these members are shaped in accordance with the laws which will be developed herebelow and it will be observed that as valve head 22 moves downwardly with increasing pressure in the inlet 12 to the meter, that more of the curved surfaces 30 and 47 will be in engagement with the springs thereby decreasing the active length of the springs and increasing their resistance. By proper design of the curvature of the surfaces of the springs the requisite nonlinear support for the poppet head 22 is obtained.

The flow through the orifice, by the use of the meter above described, can be measured as a linear function of the pressure drop through the orifice. This pressure drop is measured by means linearly responsive to pressure drop and is shown in the form of a manometer 50. The manometer includes a continuous tube 52 with its ends 54 and 56 in communication with the flow meter. The upper end 54 leads into the flow stream upstream of the orifice member 16 and the other end 56 leads into the flow stream downstream of the orifice. Within the manometer is a liquid 58 which will be displaced within the tube 52 in accordance with the pressure differential in the two ends. The manometer tube is formed of plastic or glass or the like so as to be clear in order that the level of the liquid can be viewed. Since the downstream pressure will be lower than the upstream pressure the liquid 58 will be displaced in the manner illustrated in Fig. 1 and the difference in displacement can be read on the linear scale 60 as shown by the dimension R at 62. This dimension indicates pressure differential and the scale 60 may be graduated directly in terms of flow rate of a given fluid if desired. With adjustments of the adjusting knob 40, however, the scale of the meter 60 will be changed so that a conversion factor must be used. If desired, a scale may be utilized in connection with the adjustment knob 40 which can be readily correlated to the scale 60 so that the flow readings can quickly and easily be made.

In the form of the invention shown in Fig. 4, the valve head is contoured with a surface of revolution to obtain a logarithmic relation in the area of the throat with changes in pressure head and the orifice member is movably mounted, being supported by a nonlinear spring action that is exponential.

Again the flow meter, as shown generally by the housing 62, is placed in the flow stream and is provided with an inlet 64 and a discharge 66. The valve poppet or head 68 is non-movably mounted within the housing for fixed set of operating conditions and is shown at 68 having a profile or a contoured surface of revolution 70. The head is supported on a stem 72 which is adjustably engaged by threads 74 into the housing 62 of the meter 62. The stem is provided with an adjustment knob 76 which provides for rotation of the stem and movement of the head 68 up and down to thereby vary the range and sensitivity of the meter.

The throat or flow path 78 is defined between the head and the orifice member 80. In this instance, the orifice member is provided with a thin knife blade edge 82 which, as in the case of the knife blade edge 24 (Fig. 1) of the head 22, reduces the opportunity for error with turbulence and other dynamic effects with the flow of fluid.

The nonlinear support for the orifice is derived from a spring 81 having a group of cantilever leaves 83. The spring leaves are backed by an annular support ring 84 having a curved upper face 86. The support ring 84 is suitably connected to the housing 62 and the curved surface 86 projects inwardly beneath the cantilever springs 83. The springs are also suitably secured at their base in the housing and may be connected by forming the housing of an upper portion 88 and a lower portion 90 and suitably connecting the housing portions together with the spring 81 and support ring 84 being clamped therebetween.

The orifice member 80 is carried at the inner free turned up ends 85 of the springs 83. To prevent the by-pass of any of the fluid around the orifice member, a suitable bellows 86a is connected between the outer edge 87 of the circular orifice member 80 and the housing 62. These bellows are designed to prevent the passage of fluid and to offer a very low resistance to movement of the orifice member 80 as supported by the cantilever springs 83.

With variations in pressure head at the inlet 64 of the meter, the orifice member 80 will move up and down varying the cross sectional area of the flow path 78. As the orifice member moves downwardly with increasing fluid pressure head, the cantilever springs 83 will bend downwardly to rest on an increasingly larger area of the upper face 86 of the support ring 84 thus reducing the effective length of the cantilever springs 83 and increasing their spring resistance. Thus, by the design in accordance with the mathematical formulae which is presented below, a proper nonlinear backing for the orifice and an exponential spring action is obtained so that the meter discharge will increase linearly with pressure drop across the orifice member.

To measure this linear pressure drop, a means for measuring linear pressure variation is provided, shown in the form of a manometer 92. The lower end 94 of the manometer leads through the wall of the meter housing 62 to communicate with the downstream pressure of the fluid and the upper end 96 leads through the wall of the meter to communicate with the upstream pressure. The pressure differential will cause a variation of level of the measuring liquid 98 within the manometer, and this difference can be readily observed on a scale 100 which may be graduated in accordance with fluid flow rate through the meter. Again, with different settings of the head 68 as caused by rotation of the control knob 76, the range of the meter wil be changed and the scale 100 must be so calibrated.

The shape of the profiled member in the throat, the orifice for Fig. 1 and the head for Fig. 4, is in accordance with the law developed in my copending application entitled "Adjustable Flow Control," U.S. Serial No. 446,867, filed July 30, 1954. This shape follows the general profile law $$C_D A = (C_D A)_{min} e^{\frac{x' \ln H}{2Y_0}}$$

The shape of the throat profile is formed in accordance with the relationship $$x = \frac{2Y_0}{\ln H}\left\{\ln\left[2\sqrt{2}\frac{r_0 + \frac{t}{2}}{r'^2 - r_0^2}\frac{Y_0}{\ln H}\sqrt{1 - \sqrt{1 - \left(\frac{t \ln H}{Y_0}\right)^2}}\right] - \frac{1}{2}\left[1 - \sqrt{1 - \left(\frac{t \ln H}{Y_0}\right)^2}\right]\right\}$$

Also as presented in my aforementioned copending application, the spring and backing are constructed in accordance with the spring equation for any given head $$h = h_0 H e^{-\frac{y \ln H}{Y_0}}$$

and a spring and support is provided in accordance with the relationships $$\frac{Y_0}{2 \ln H} \ln \frac{2F}{F_0} + \frac{F_0 l^3}{24EI} = \frac{1}{6}(l-x_0)^2\frac{d^2y_0}{dx_0^2} + \frac{2}{3}(l-x_0)\frac{dy_0}{dx_0} + y_0$$

and $$\bar{y} = \frac{3}{4 \ln H}(1-\bar{x})^2 - 2 \ln (1-\bar{x}) - 1$$

Utilizing the structural features hereinabove discussed, wherein a nonlinear spring backing is used yielding exponential spring action to support a movable valve member, and wherein one of the valve members has a contour so that the flow area varies exponentially, a relationship will be obtained whereby increasing the pressure in the flow conduit will vary the velocity of flow and a definite linear relationship will occur between flow and pressure drop across the valve member. For example, four times the pressure will yield twice the velocity through the throat area and will cause the valve to open to avail twice the area, hence, giving four times the discharge. Thus, the pressure drop across the valve can be measured as being directly proportional to the discharge. By adjusting the position of the spring backing, the ratio of discharge to head is a function of the control knob setting.

With reference to Fig. 3, the development of the spring backing and the profile of the throat area can be best described.

Using the notation shown in the figure, the area as a function of $x'$ is $$C_D A = (C_D A)_{min} e^{\frac{x' \ln H}{2Y_0}} \quad (1)$$

where $Y_0$ is the spring displacement from minimum head $h_0$ to maximum head $h_0 H$.

The spring displacement law is $$h = h_0 H e^{-\frac{y \ln H}{Y_0}} \quad (2)$$

where $y$ varies from 0 at maximum head to $Y_0$ at minimum head.

Substituting into the discharge equation $$Q = C_D A \sqrt{2gh} \quad (3)$$

$$Q = (C_D A)_{min}\sqrt{2g}\, e^{\frac{x' \ln H}{2Y_0}} e^{-\frac{y \ln H}{2Y_0}} \sqrt{h_0 H} \quad (4)$$

or, since $z' = x' + y$ $$Q = (C_D A)_{min}\sqrt{2gh_0H}\, e^{(x'-y)\frac{\ln H}{2Y_0}}$$

$$= (C_D A)_{min}\sqrt{2gh_0H}\, e^{\frac{(z'-2y)\ln H}{2Y_0}} \quad (5)$$

$$= (C_D A)_{min}\sqrt{2gh_0H}\, e^{\frac{z' \ln H}{2Y_0}} \frac{h}{h_0 H} \quad (6)$$

or $$Q = (C_D A)_{min}\sqrt{\frac{2g}{h_0 H}}\, e^{\frac{z' \ln H}{2Y_0}} h \quad (7)$$

Equation 7 above shows that Q, the discharge, varies directly as the head across the valve member. It will also be noted that the proportionality constant can be altered by setting $z'$, which is the location of the spring backing.

As an example of a form of operation of the flow meter, considering $h$ held constant (a linear spring could be used for this case), the setting $z'$, would measure the discharge with constant percent error in the setting, due to the exponential relationship.

It will also be seen from the above discussion that the principle of operation for the embodiments of Figs. 1 and 2 is substantially similar.

In the foregoing equations the symbols are used generally to represent the following:

$A$ = area of opening between disc and throat
$C_D$ = discharge coefficient
$e$ = base of natural logarithms
$E$ = modulus of elasticity of spring material
$F$ = pressure force on disc
$F_0$ = minimum design force on disc
$H$ = ratio of maximum fluid head to minimum fluid head
$h$ = head drop across disc
$I$ = moment of inertia of spring cross section about neutral axis
$h_0$ = minimum design head loss across disc
$l$ = effective spring length when $h = h_0$
$\ln$ = natural logarithm
$Q$ = discharge
$r$ = radial coordinate of throat
$r'$ = minimum throat radius
$r_0$ = disc radius
$t = r - r_0$ $w$ = unit weight of fluid
$x$ = axial coordinate of throat profile
$\bar{x} = x_0/l$
$x'$ = position of disc in throat
$x_0$ = coordinate of spring backing profile
$Y_0$ = value of $y$ for $h = h_0$ (maximum displacement of spring)
$y$ = position of spring
$y_0$ = coordinate of spring backing
$\bar{y} = y_0/Y_0$
$z'$ = discharge setting From the foregoing it will be seen that I have provided a flow meter which accomplishes the objectives and advantages hereinbefore set forth. The device is structurally sturdy and simple and capable of reliable long operation without requiring frequent adjustment or presenting changes in values. The device is also free from inherent error and will function to give a true and accurate indication of the rate of flow of a fluid.

I have, in the drawings and specification, presented a detailed disclosure of the preferred embodiment of my invention, but it is to be understood that I do not intend to limit the invention to the specific form disclosed but intend to cover all modifications, changes and alternative constructions and methods falling within the scope of the principles taught by my invention.

I claim as my invention:

A flow meter comprising in combination a housing having an inlet and a discharge outlet for connecting in the flow stream, an orifice member between the inlet and outlet and defining a flow opening therethrough, a movable valve head within said orifice defining a flow area therebetween, the orifice member having an orifice with a profile whereby the cross sectional area increases in a downstream direction, a nonlinear support for the movable valve head including a cantilever spring operatively connected to the head, a curved backing for the spring so that the acting length of the spring decreases with displacement to provide a nonlinear support for the head, an adjustable support for said curved backing to vary the position of the head relative to the orifice relative to the sensitivity of the meter, and a pressure differential response member connected to measure the pressure drop across the orifice in terms of the rate of flow therethrough, said orifice and said cantilever spring being relatively designed to cause a logarithmic increase of throat area with displacement of the valve head and the spring providing an exponential support for the valve head whereby the pressure drop across the orifice will vary linearly with the flow.

References Cited in the file of this patent
UNITED STATES PATENTS

| | | |
|---|---|---|
| 1,904,337 | Turner | Apr. 18, 1933 |
| 2,325,884 | Schorn | Aug. 3, 1943 |
| 2,775,890 | Waldron | Jan. 1, 1957 |

FOREIGN PATENTS

| | | |
|---|---|---|
| 341,786 | Germany | Oct. 7, 1921 |

OTHER REFERENCES

An article by Clurman in the ASME, Transactions, vol. 73, 1951, pp. 151–161.